US005270843A

United States Patent [19]

Wang

[11] Patent Number: 5,270,843

[45] Date of Patent: Dec. 14, 1993

[54] DIRECTLY FORMED POLYMER DISPERSED LIQUID CRYSTAL LIGHT SHUTTER DISPLAYS

[76] Inventor: Jiansheng Wang, 17423 Calla Dr., Dallas, Tex. 75252

[21] Appl. No.: 938,881

[22] Filed: Aug. 31, 1992

[51] Int. Cl.[5] ............ G02F 1/133

[52] U.S. Cl. ............ 359/52; 359/51; 359/106

[58] Field of Search ............ 359/51, 52, 103, 106

[56] References Cited

U.S. PATENT DOCUMENTS

| | | | |
|---|---|---|---|
| 3,585,381 | 6/1971 | Hodson et al. | 359/51 |
| 3,600,060 | 8/1971 | Churchill et al. | 359/51 |
| 3,720,623 | 3/1973 | Cartmell et al. | 359/51 |
| 4,101,207 | 7/1978 | Taylor | 359/81 |
| 4,316,041 | 2/1982 | Totten et al. | 556/420 |
| 4,357,374 | 11/1982 | Ogawa | 428/1 |
| 4,456,638 | 6/1984 | Petcavich | 428/1 |
| 4,605,284 | 8/1986 | Fergason | 359/51 |
| 4,606,611 | 8/1986 | Fergason | 359/51 |
| 4,616,903 | 10/1986 | Fergason | 359/51 |
| 4,643,528 | 2/1987 | Bell, Jr. | 359/92 |
| 4,671,618 | 6/1987 | Wu | 359/94 |
| 4,673,255 | 6/1987 | West et al. | 359/94 |
| 4,685,771 | 8/1987 | West et al. | 359/52 |
| 4,688,900 | 8/1987 | Doane et al. | 359/52 |
| 4,707,080 | 11/1987 | Fergason | 359/52 |
| 4,728,547 | 3/1988 | Vaz | 428/1 |
| 4,856,876 | 8/1989 | Fergason | 359/51 |
| 4,869,847 | 9/1989 | Leslie | 359/52 |
| 4,878,741 | 11/1989 | Fergason | 359/68 |
| 4,884,873 | 12/1989 | Fergason | 359/52 |
| 4,891,152 | 1/1990 | Miller | 252/299.01 |
| 4,938,568 | 7/1990 | Margerum et al. | 359/52 |
| 4,950,052 | 8/1990 | Fergason | 359/52 |
| 4,971,719 | 11/1990 | Vaz | 252/299.5 |
| 5,011,624 | 4/1991 | Yamagishi | 252/299.5 |
| 5,021,188 | 6/1991 | Vaz | 252/299.5 |
| 5,056,898 | 10/1991 | Ma et al. | 359/94 |
| 5,082,351 | 1/1992 | Fergason | 359/51 |
| 5,087,387 | 2/1992 | Mullen et al. | 252/299.5 |
| 5,089,904 | 2/1992 | Fergason | 359/52 |
| 5,096,282 | 3/1992 | Margerum et al. | 359/51 |
| 5,200,845 | 4/1993 | Crooker et al. | 359/51 |

OTHER PUBLICATIONS

West, John L., Chapter 32 "Polymer-Dispersed Liquid Crystals," *Liquid-Crystalline Polymers*, pp. 475–495, 1990.

J. W. Doane et al., "12.5: Wide-Angle-View PDLC Displays," *SID 90 Digest*, pp. 224–226.

Y.-D. Ma and B.-G Wu, "Reverse-mode microdroplet liquid crystal display," *SPIE vol. 1257 Liquid Crystal Displays and Applications* (1990), pp. 46–56.

C. K. Ober and R. A. Weiss, "Current Topics in Liquid-Crystalline Polymers", *Liquid-Crystalline Polymers*, 1990 American Chemical Society, pp. 1-11.

*Primary Examiner*—William L. Sikes

*Assistant Examiner*—Huy Mai

*Attorney, Agent, or Firm*—Pravel, Hewitt, Kimball & Krieger

[57] ABSTRACT

A polymer dispersed liquid crystal display device is provided comprising a copolymer formed from monomers having significantly different reactivities. A reverse mode device is provided consisting of negative liquid crystal microdroplets dispersed in a non-homogeneous polymer matrix consisting of a monomer having a high reactivity and a high surface free energy and another monomer having a low reactivity and has a low surface free energy. The surface active monomer is preferentially distributed at the surface of microdroplets formed by phase separation, causing homeotropic alignment of the liquid crystals.

23 Claims, 9 Drawing Sheets

28

DIRECTLY FORMED POLYMER DISPERSED LIQUID CRYSTAL LIGHT SHUTTER DISPLAYS

BACKGROUND OF THE INVENTION

1. Field of the Invention

This invention relates to liquid crystal light shutters and methods for producing such devices. More specifically, monomers and liquid crystals are mixed; polymerization causes microdroplets of liquid crystals to form by phase separation. Wide viewing angle normal or reverse mode displays are provided by using monomers having differing reactivities.

2. Description of Related Art

Liquid crystal displays (LCDs) have grown rapidly in importance in recent years. The LCD is now second only to the cathode ray tube in the market for displays. Many other applications, such as switchable windows in buildings and automobiles, large advertising displays and other uses are being considered. The property of liquid crystals that makes the material useful in displays is its birefringence. This property can be used to form devices having the ability to transmit or to scatter or absorb light, dependent on whether an electric field is applied to the material.

One of the new developments in LCDs in recent years has been polymer dispersed liquid crystal (PDLC) displays. In this type LCD, liquid crystal material is contained in microdroplets embedded in a solid polymer matrix. Such displays are formed by phase separation of low-molecular weight liquid crystals from a prepolymer or polymer solution to form microdroplets of liquid crystals. A survey of these materials is provided in *Liquid-Crystalline Polymers*, ACS Symposium Series 435, Chap. 32, pp. 475–495, 1990. Another approach to obtaining dispersed microdroplets in a polymer matrix is the method of encapsulating or emulsifying the liquid crystals and suspending the liquid crystals in a film which is polymerized.

Birefringence results from a material having a different index of refraction in different directions. The extraordinary index of refraction ($n_e$) of a liquid crystal molecule is defined as that measured along the long axis of the molecule, and the ordinary index of refraction ($n_o$) is measured in a plane perpendicular to the long axis. The dielectric anisotropy of liquid crystals is defined as $\Delta\epsilon=\epsilon_{\parallel}-\epsilon\perp$, where $\epsilon_{\parallel}$ and $\epsilon\perp$ are parallel and perpendicular dielectric constants, respectively. Liquid crystals having a positive dielectric anisotropy ($\Delta\beta>0$) are called positive-type liquid crystals, or positive liquid crystals, and liquid crystals having a negative dielectric anisotropy ($\Delta\beta<0$) are called negative-type liquid crystals, or negative liquid crystals. The positive liquid crystals orient in the direction of an electric field, whereas the negative liquid crystals orient perpendicular to an electric field. These electro-optical properties of liquid crystals have been widely used in various applications.

A normal mode display containing liquid crystals is non-transparent (scattering or absorbing) in the absence of an electric field and is transparent in the presence of an applied electric field. Normal mode liquid crystal displays can be fabricated by the encapsulating or emulsion process, as described, for example, in U.S. Pat. Nos. 4,435,047, 4,605,284 and 4,707,080. This process includes mixing positive liquid crystals and encapsulating material, in which the liquid crystals are insoluble, and permitting formation of discrete capsules containing the liquid crystals. The emulsion is cast on a substrate, which is precoated with a transparent electrode, such as an indium tin oxide coating, to form an encapsulated liquid crystal device.

Normal mode polymer dispersed liquid crystal (PDLC) displays can also be fabricated by a phase separation process. This process, described in U.S. Pat. Nos. 4,685,771 and 4,688,900, includes dissolving positive liquid crystals in an uncured resin and then sandwiching the mixture between two substrates which are precoated with transparent electrodes. The resin is then cured so that microdroplets of liquid crystals are formed and uniformly dispersed in the cured resin to form a polymer dispersed liquid crystal device. When an AC voltage is applied between the two transparent electrodes, the positive liquid crystals in microdroplets are oriented and the display is transparent if the refractive index of the polymer matrix ($n_p$) is made to equal the ordinary index of liquid crystals ($n_o$). The display scatters light in the absence of the electric field, because the directors (vector in the direction of the long axis of the molecules) of the liquid crystals are random and the refractive index of the polymer cannot match the index of the liquid crystals. Nematic liquid crystals having a positive dielectric anisotropy ($\Delta\beta>0$), large $\Delta n$, which may contain a dichroic dye mixture, can be used to form a scattering and absorbing mode.

A reverse mode display is transparent in the absence of an electric field and is non-transparent (scattering or absorbing) in the presence of an applied electric field. A recently-developed reverse mode microdroplet liquid crystal light shutter display is disclosed in U.S. Pat. No. 5,056,898. This display is said to have a reverse effect in modulating optical states. In order to achieve a reverse effect, the emulsion process was utilized and two major steps were required. First, nematic negative liquid crystals and a dopant, such as silane, were dispersed in a liquid polymer solution which had a high surface free energy, to form microdroplets of liquid crystals in the polymer matrix after solvent removal. Second, after the droplets were formed, the surface free energy of the polymer which encased the liquid crystals and dopant was modified by a reaction of the dopant with functional groups in the inner surface of polymer wall. The newly-formed inner surface layer has a low surface energy and aligns the nematic liquid crystals perpendicular to this layer. The structure of the display is multilayers of flat microcapsules with a homogeneous material as the capsule skin.

If nematic negative liquid crystals are aligned perpendicular to the inner surface layer, but not to the substrate surface of a display, liquid crystals in microdroplets are not entirely perpendicular to the substrate. Ends of the elongated droplets contain liquid crystals that are not perpendicular to the substrate. The central part of liquid crystals in the droplets is clear if the refractive indexes of the polymer and inner surface layer match the ordinary refractive index of the liquid crystals ($n_o$) at off-state. However, liquid crystals near the ends of the microdroplet are strongly bent because they are perpendicular to the skin of the inner layer. They are, therefore, tilted to the substrate surface, and the refractive index of the liquid crystals cannot match With the refractive indexes of the polymer matrix and inner layer. Therefore, parts of the liquid crystal droplets scatter light and produce haze.

Some polymer dispersed liquid crystal displays are formed by a solvent evaporation method. A disadvantage of the method employing solvent evaporation to form a display is the long time to evaporate solvents from coatings. If a dopant is used, the reaction between the polymer skin and the dopant may require a long time. Also, this method requires a protective polymer layer to prevent evaporation of liquid crystals in microdroplets during heating under vacuum for evaporation of solvent. Therefore, a higher voltage is normally required to drive the display, which is not desirable.

There is a need for a method of forming displays which does not require solvent evaporation, and which allows formation of a reverse mode display by simultaneous formation of liquid crystal microdroplets which are aligned perpendicular to a substrate and in a polymer matrix. There is also a need for displays, both normal and reverse mode, which have a minimum amount of haze and a wide viewing angle.

SUMMARY OF THE INVENTION

A liquid crystal display is disclosed which in one embodiment is comprised of a transparent copolymer formed from monomers having significantly different reactivities to produce a wide viewing angle with monomers having selected indices of refraction. In another embodiment, the higher reactivity monomer is a normal or high surface free energy monomer and the lower reactivity monomer is a surface active or lower surface free energy monomer, a combination which is used to produce a homeotropic alignment of negative liquid crystals in microdroplets to form a reverse mode display.

DETAILED DESCRIPTION OF THE INVENTION

Figure 1:
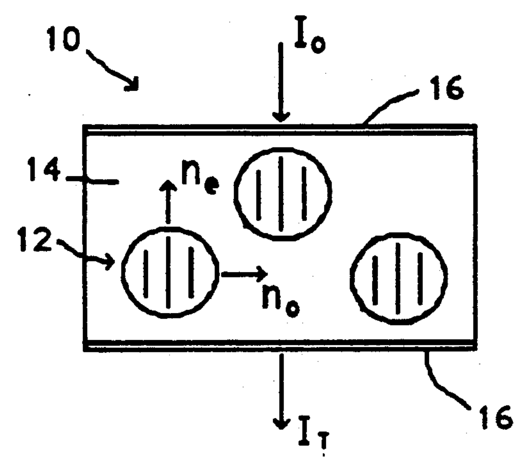
FIG. 1 is a sketch of a reverse mode liquid crystal display in the "off"0 state.

Referring to FIG. 1, a reverse mode display 10 of this invention in the "off" state, i.e. with no electric voltage applied to the display, is illustrated. A phase separation has been utilized to spontaneously form microdroplets of liquid crystals 12. These microdroplets are embedded in transparent polymer matrix 14. Electrically conducting transparent layers 16 enclose the plastic matrix 14. With no electric field applied between the transparent electrodes 16, the liquid crystals are aligned perpendicular to the substrate by chemical means which will be described below. The refractive index of the polymer, $n_p$, adjacent to the inner surface of microdroplets of liquid crystals is selected to match the refractive index $n_o$ of the liquid crystals when aligned in the direction of incident light. Incident light $I_o$ then passes through the display 10 with almost no scattering, and transmitted light $I_T$ retains the intensity of the incident light.

Figure 2:
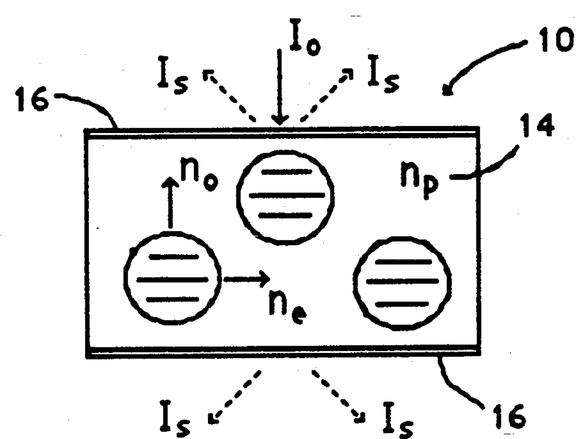
FIG. 2 is a sketch of a reverse mode liquid crystal display in the "on" state.

FIG. 2 is a view of the same display 10 in the "on" state. Microdroplets of liquid crystals 12 are dispersed in polymer matrix 14. An electric voltage is applied between transparent electrodes 16 on each side of the plastic layer. The resulting electric field around the droplets 12 has caused the liquid crystal molecules to orient perpendicular to the electric field, since the liquid crystals are selected to be negative-type, that is, to have a negative dielectric anisotropy. The refractive index of liquid crystals in the droplets in the direction of incident light $I_o$ is then $n_e$, which differs from the refractive index of the polymer, $n_p$. Thus, the incident light is scattered by the microdroplets, as indicated by the lines $I_s$. The intensity of transmitted light is thus greatly reduced.

Figure 3:
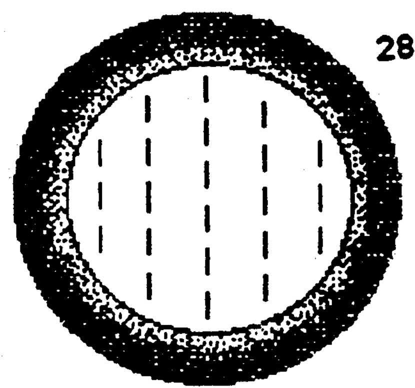
FIG. 3 is a droplet of liquid crystals in its polymer wall showing distribution of the different monomers in a polymer matrix.

FIG. 3 qualitatively shows a microdroplet of liquid crystals embedded with non-homogeneous polymer of this invention, where dark areas represent high reactivity monomer units and light areas represent low reactivity monomer units. For a reverse mode display in the "off" state, dark areas represent high reactivity and high surface energy monomer units and light areas represent low reactivity and low surface energy monomer units. Microdroplet size may be from about 0.1 to about 10 microns.

The following theory can be used to explain how the present invention is accomplished. Alignment of liquid crystals obeys the Friedel-Creagh-Kmetz rule:

$\gamma_p < \gamma_{LC} \rightarrow$ homeotropic alignment $\gamma_p > \gamma_{LC} \rightarrow$ parallel alignment Where $Y_p$ is surface tension or surface free energy of a polymer and $\gamma_{LC}$ is the surface tension or surface free energy of liquid crystals. In a homeotropic alignment, the liquid crystal molecules are substantially aligned perpendicular to the surface of polymer. In a parallel alignment, the liquid crystal molecules are aligned parallel to the surface of polymer. This invention provides novel methods for direct formation of microdroplets with homeotropic alignment by supplying molecules at the polymer-liquid crystal interface which satisfy the condition of surface tensions necessary for homeotropic alignment. The displays can be reversibly switched between a transparent mode and a non-transparent mode by electric or magnetic fields.

In one embodiment of this invention, a phase separation technique is used to directly form reverse mode liquid crystal microdroplets dispersed in a polymer matrix containing surface active monomer units. The materials and technique are characterized by two phases, polymer matrix and liquid crystals, with anisotropic polymer in a microscopic scale. Nematic liquid crystals of the negative-type are used. Two or more reactive monomers can be used. (Dimers, oligomers or resins can be used, but to simplify the following description only monomers will be discussed.) The term "reactive monomer", when used herein, will include reactive dimers, oligomers and resins. One (or more) reactive monomer should have a higher reactivity and a higher surface free energy. Another reactive monomer should have a lower reactivity and a lower surface free energy. These two kinds of monomers are mixed together with liquid crystals to give a homogeneous solution at a certain temperature and the reactive monomers are then cured. The resulting liquid crystal microdroplets are separated from the polymer and uniformly dispersed in the polymer matrix.

At a small scale, such as a micrometer, copolymer formed at a different curing stage has a different composition. Since the fast curing monomer preferentially enters the copolymer, there is a drift in the copolymer composition toward more of the less reactive monomer as the degree of conversion increases. Therefore, referring to FIG. 4, from the center of the polymer wall between two droplets of liquid crystals to the solid-liquid interface 11, surface free energy is continuously reduced, as is qualitatively illustrated in the figure. The Y axis represents surface free energy $\gamma_p$ and the X axis is the distance between droplets. If the Y axis represents the instantaneous percentage of normal monomer units in the copolymer, FIG. 4 also qualitatively shows a distribution of normal monomer units in the copolymer. For comparison, the distribution of surface free energy in reverse mode displays based on encapsulation or emulsification is shown in FIG. 5. A solid-solid interface and an inner polymeric layer 18 may exist in the encapsulation method.

Figure 4:
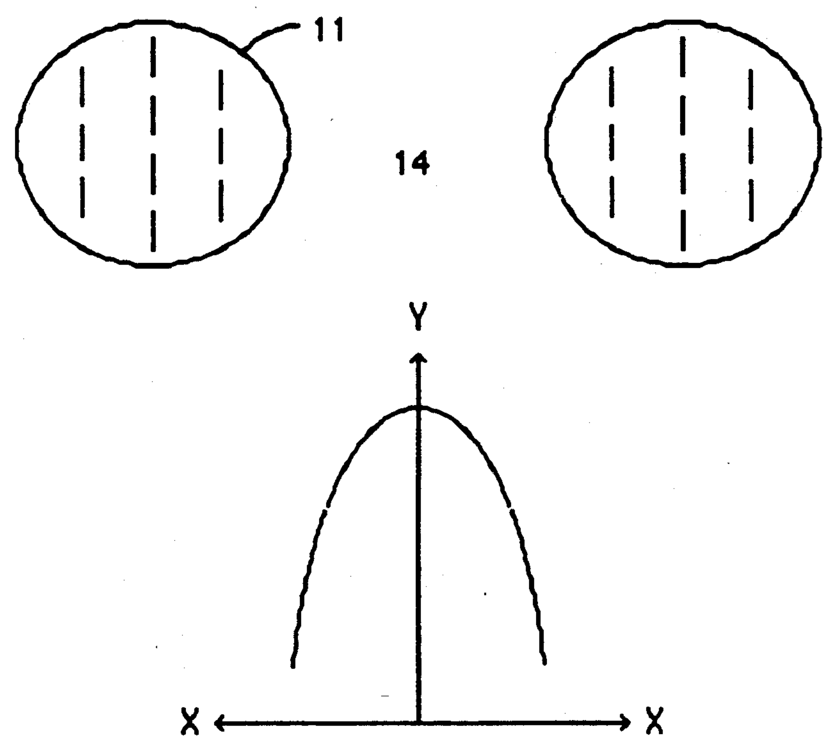
FIG. 4 is an illustration of the variation of surface free energy between the surfaces of droplets in a polymer matrix of the present invention.
Figure 5:
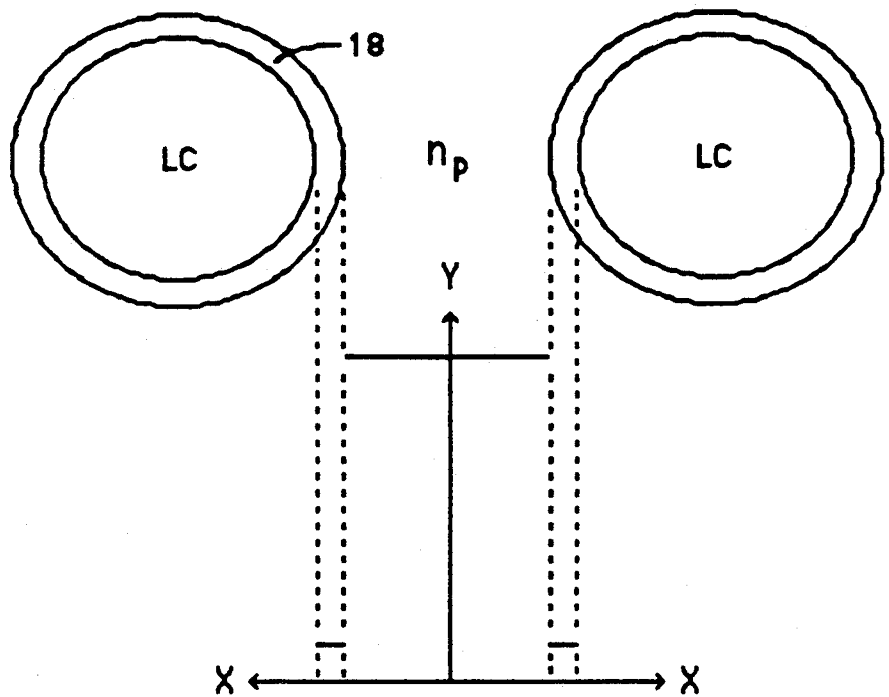
FIG. 5 is an illustration of the variation of surface free energy between the surfaces of droplets formed from encapsulation in a polymer matrix.

Although the polymeric phase is anisotropic in microstructure in FIGS. 3 and 4, it is uniform in macrostructure. Such a film is defined herein as non-homogeneous. The polymer matrix has only one phase, that is, there is no interface in the polymer. Therefore, light is not scattered or reflected when it travels through the polymeric matrix having continuously varying composition around the droplets. This is a great advantage in producing displays having less haze, or greater transmission of light when the liquid crystals are aligned so as to minimize scattering of light. In other polymer dispersed displays, there is only one constant polymer refractive index. In this invention, the refractive index may be continuously varied with distance away from the liquid crystal droplets.

In order to obtain a clear state with this invention, the refractive index of the polymer adjacent to the inner surface is matched with the ordinary refractive index of the liquid crystal, $n_o$. When using a surface active comb-shaped polymer or liquid-crystalline polymer as a part of the polymer adjacent to the inner polymeric surface, this matching becomes quite easy. Since the properties and structures of the liquid crystalline polymer and liquid crystals are similar, their refractive indices usually are very close. This invention thus provides a practical and convenient way to obtain a clean state (low scattering) and wide viewing-angle reverse mode display.

When a coating of a single monomer or its homopolymer causes a parallel alignment with liquid crystals, this monomer will be called herein a high surface free energy monomer or normal monomer. This normal monomer unit in a polymer is expressed by $M_h$, and the homopolymer is called herein a high surface free energy polymer or normal polymer. When a coating of a monomer or its homopolymer offers a homeotropic alignment to liquid crystals, this monomer will be called herein a surface active monomer, and the homopolymer will be called herein a surface active polymer. This surface active monomer unit in a polymer is expressed by $M_s$. Similarly, the definition may be extended to oligomers or resins.

Consider a simple system consisting of two kinds of monomers. The normal monomer has a higher reactivity and the surface active monomer has a lower reactivity. These two kinds of monomers are mixed with liquid crystals to form a homogeneous solution. Depending on the monomers used, the mixture can be cured by different processes, such as thermal or ultraviolet (UV) processes. Using both a normal monomer and a surface active monomer is an important characteristic of the present invention to produce a reverse mode display by copolymerization.

Now, assume several stages in the entire curing process. At an early curing stage, more reactive normal monomer has a larger probability of entering the copolymer and the less reactive surface active monomer has a small probability of entering the copolymer. A newly formed copolymer contains a high percentage of normal monomer units and a low percentage of surface active monomer units. According to mean field theory, such copolymer surface will have a high surface free energy. At this stage, the molecular weight of the copolymer is low and a new phase may or may not be formed.

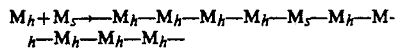

$$M_h+M_s \rightarrow -M_h-M_h-M_h-M_h-M_s-M_h-M_h-M_h-M_h-M_h-$$

At the middle curing stage, phase separation occurs. In the solid phase, the newly-formed copolymer still consists of more normal monomer units and less surface active monomer units, and the copolymer possesses high surface free energy. In the liquid phase, the mixture contains both surface active monomer and normal monomer as well as liquid crystals. The surface free energy of the homogeneous liquid mixture is lower than that of the newly formed copolymer. Based on this mechanism, liquid crystal microdroplets dispersed in polymer can be easily formed, because surface tension of the copolymer $\gamma_p$ is greater than surface tension of the liquid mixture $\gamma_L$. The newly formed copolymer has parallel alignment to the encased liquid mixture. When the polymerization continues, the molecular weight of the polymer gets larger and larger, and the viscosity of the copolymer gets higher and higher. After the viscosity of the copolymer gets high enough to prevent coalescence of droplets, the system becomes stable.

At a later curing stage, a ratio of surface active monomer units to normal monomer units gets higher and higher in a newly formed copolymer and the instantaneously formed copolymer has lower and lower surface free energy. A reverse effect is achieved when the polymeric surface possesses a lower surface free energy and the liquid phase possesses higher surface free energy. Finally, almost all of the reactive monomers have entered into the copolymer and the liquid phase is quite clean except for unreactive liquid crystal molecules. The polymeric phase is rigid and forms the structure encasing microdroplets of liquid crystals.

During this process, the surface free energy of newly formed polymer becomes lower and lower. Distribution of different monomers gradually changes during the polymerization. When these two types of reactive monomers are completely cured to form microcapsules of liquid crystals, the final inner surface has a low surface free energy and aligns liquid crystals in an axial texture.

The two kinds of monomers should have significantly different reactivities and different surface free energies. If a selected monomer has higher reactivity, it should also have high surface free energy; if a monomer has lower reactivity, it should also have low surface free energy. The two kinds of monomers may react with each other or with itself. Any type curing system may be used. Thermal curing and UV curing represent two of the most useful processes. The switching time of such displays may be from about 1 to more than several milliseconds, depending on materials, processes and the conditions used.

Figure 6:
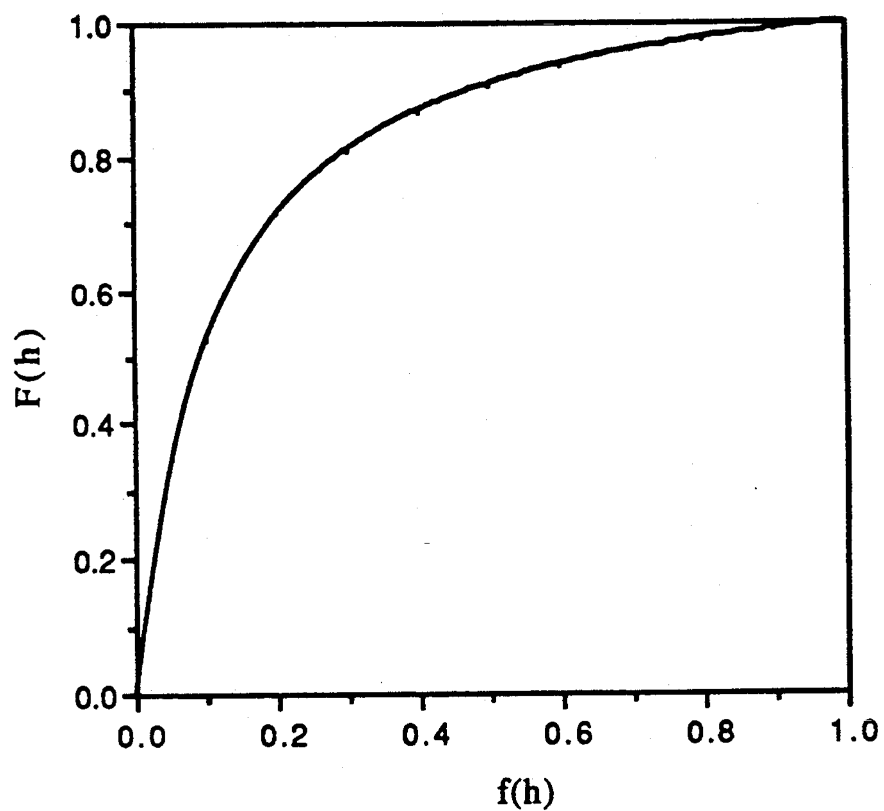
FIG. 6 is a graph of composition of a copolymer made up of monomers having differing reactivities.

The principle of different reactivities of this invention can also be illustrated by a copolymeric composition curve, as shown in FIG. 6. Consider the case for copolymerization of the two monomer unit $M_h$ and $M_s$. Again, assume monomer $M_h$ is normal monomer and monomer $M_s$ is surface active monomer, and define $r_h$ and $r_s$ as monomer reactivity ratios, respectively. $r_h$ and $r_s$ are defined by their rate constants, $r_h=k_{hh}/k_{hs}$ and $r_s=k_{ss}/k_{sh}$. If $f_h$ and $f_s$ are the instantaneous mole fraction of monomers $M_h$ and $M_s$ in the liquid mixture, and $F_h$ and $F_s$ are the instantaneous mole fraction of monomer unit $M_h$ and $M_s$ in the copolymer, respectively. A relationship between mole fraction $F_h$ of normal monomer $M_h$ units in copolymer and mole fraction $f_h$ of monomer $M_h$ in the liquid mixture can be expressed by the following equation:

$$F_h = \frac{r_h f_h^2 + f_h f_s}{r_h f_h^2 + 2 f_h f_s + r_s f_s^2}$$

This equation indicates that the instantaneous mole fraction $F_h$ of monomer unit $M_h$ in the copolymer is dependent on reactivity ratios $r_h$ and $r_s$ and the instantaneous mole fraction, $f_h$ and $f_s$, of monomers $M_h$ and $M_s$ in the liquid mixture. Without accounting for unreactive liquid crystals, the sum of the mole fraction $f_h$ and $f_s$ in the liquid mixture is equal to unity, $f_h+f_s=1$. For a practical assumption, $r_h=10$ and $r_s=0.1$. $F_h$ represents a component of monomer $M_h$ in instantaneously formed copolymer. FIG. 6 shows this relationship. This figure indicates that at an early stage of copolymerization the copolymer will contain a large proportion of the more reactive monomer $M_h$ in random placement. At a later stage of copolymerization, the copolymer will contain a large proportion of the less reactive monomer $M_s$ in random placement. For example, if a copolymerization starts with 80% normal monomer $M_h$ and 20% surface active monomer $M_s$, the initial composition of the copolymer will contain 97% monomer $M_h$ units. While over half of the total moles of these two monomers are polymerized and about 50% monomer $M_h$ is left in the liquid mixture, phase separation may occur. The instantaneously formed copolymer will contain about 90% $M_h$ units and 10% $M_s$ units, and such copolymer may offer a parallel alignment. While 5% monomer $M_h$ is left in the liquid mixture, the copolymer will only contain 35% monomer $M_h$ and 65% monomer $M_s$, and such copolymer may offer a homeotropic alignment. Near the last stage of copolymerization, the surface of the copolymer will be covered with almost pure surface active monomer $M_s$ units, and result in a homeotropic alignment. The normal monomer could have any structure including, for example, a liquid-crystalline structure. Since polymer main chains consist of both normal monomers and surface active monomers and are cross-linked, the structure of the polymeric wall is quite stable.

An important feature of the present invention is spontaneous formation of liquid crystal microdroplets and homeotropic alignment of liquid crystals; that is, both these two processes proceed simultaneously under the same physical conditions. The copolymerization of differently reactive monomers first provides a practical method of directly forming the reverse mode displays.

Figure 7:
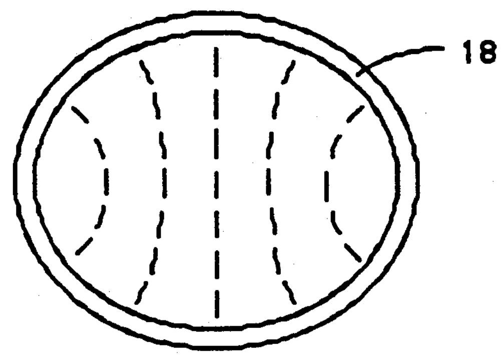
FIG. 7 is a droplet of liquid crystals in a homeotropic state embedded in a matrix, with liquid crystal molecules perpendicular to the interface.

It should be pointed out that a microdroplet inner surface with a very low surface free energy may give an axial texture with defects like the texture in FIG. 7. Liquid crystal molecules are perpendicular to the inner layer 18, which is contained in a homogeneous polymer matrix and consists of only surface active monomers, but only the liquid crystal molecules midway between the ends of the elongated droplet are perpendicular to the substrate. The tilted liquid crystal molecules produce haze. A surface with a lower surface free energy aligns liquid crystals in a defectless axial structure like that shown in FIG. 3. Preferably, all liquid crystals are aligned in one direction such that they exhibit a single ordinary refractive index $n_o$. Such weak homeotropic alignment is shown in FIG. 3, where liquid crystal molecules are entirely aligned and the refractive index of polymer $n_p$ can be easily matched to the refractive index $n_o$. There is an optimum composition of the interface between the polymer and liquid crystals to produce a display having the liquid crystal droplets aligned as in FIG. 3, thereby producing minimum haze. A droplet inner surface consisting of two kinds of monomers, normal and surface active monomers, is an important feature of the invention. It provides a convenient way to obtain a weak homeotropic alignment by controlling a ratio of the surface active monomer units to normal monomer units in the inner surface.

Three or more monomers can be used, one having a middle curing rate, to control the coverage of surface active monomer units in the final inner surface of the copolymer. Trace amounts of normal monomer with a slow curing rate can also be used for obtaining the optimum composition to produce the weak homeotropic alignment, which produces minimum haze in the display. It should be pointed out that phase separation processes can also be used to form the multi-layer reverse mode display and that the method of forming a weak homeotropic alignment by using a mixture of normal monomers and surface active monomers can be used to form the inner surface layer in the emulsion process.

A narrow viewing angle problem is usually associated with LCDs of microdroplets dispersed in an isotropic polymer. When a natural light, which can be considered made up of parallel and perpendicularly polarized light, travels through a display perpendicular to the substrate, the display is transparent in the perpendicular direction if liquid crystals are aligned normal to the substrate and if the isotropic polymer refractive index $n_p$ is matched with the ordinary refractive index $n_o$ of liquid crystals. This situation, in which both types of polarized light are perpendicular to optical axes of aligned liquid crystals, will be referred to when the incident angle is changed. When the incident angle of perpendicularly polarized light is changed, the perpendicularly polarized light is still normal to the aligned liquid crystals. This case is the same as the referenced situation. Incident angle shifting of the perpendicularly polarized light, therefore, does not cause any variation of optical effect. In other words, when the incident angle of the perpendicularly polarized light is changed, the display is still transparent. Now consider the behavior of parallel polarized light when the incident angle is changed. The parallel polarized light cannot remain normal to the aligned liquid crystals. This case is different from the referenced situation. Incident angle changes of the parallel polarized light causes a variation of optical effect. In other words, when the incident angle of the parallel polarized light is changed, the refractive indexes of the polymer matrix and the ordinary refractive index of liquid crystals are no longer matched, and a display produces haze at the varied incident angle for the parallel polarized light. The display shows a narrow viewing angle.

The narrow viewing angle problem is partially solved in normal mode PDLC displays consisting of liquid crystalline polymer matrix and liquid crystal microdroplets. In this case, both side chains in the liquid-crystalline polymer and liquid crystals are perpendicular to the substrate in the "on" state. When changing incident angle, a perpendicularly polarized light is still normal to both liquid crystal side chains in the polymeric phase and aligned liquid crystals in microdroplets. Therefore, there is no variation in optical effect. When parallel polarized light changes its incident angle, the angle between the parallel polarized light and the director (vector in the long direction of the molecules) of aligned liquid crystals in microdroplets is varied. However, this variation is just the same as the degree change between the parallel polarized light and the directors of side chains in the liquid-crystalline polymer. The total effect is no relative change between polymer matrix and liquid crystals at different viewing angles. Although optical properties of liquid-crystalline polymer cannot be exactly the same as liquid crystals because the liquid-crystalline polymer must contain main chains, the difference has been greatly reduced. Thus, a wider viewing angle can be obtained.

The principles believed to make possible the wide viewing angle of the present invention are as follows. A surface active monomer with a lower curing rate is preferentially distributed near the surface of microdroplets. Some comb-shaped polymers, or polymer contain comparatively long side chains spaced relatively closely along the main chain, are suitable as such surface active monomers. Liquid-crystalline polymers, which belong to the comb-shaped polymer category, have similar functions. A specially designed comb-shaped polymer not only can be used as the surface active monomer but also offers good optical properties.

Figure 8:
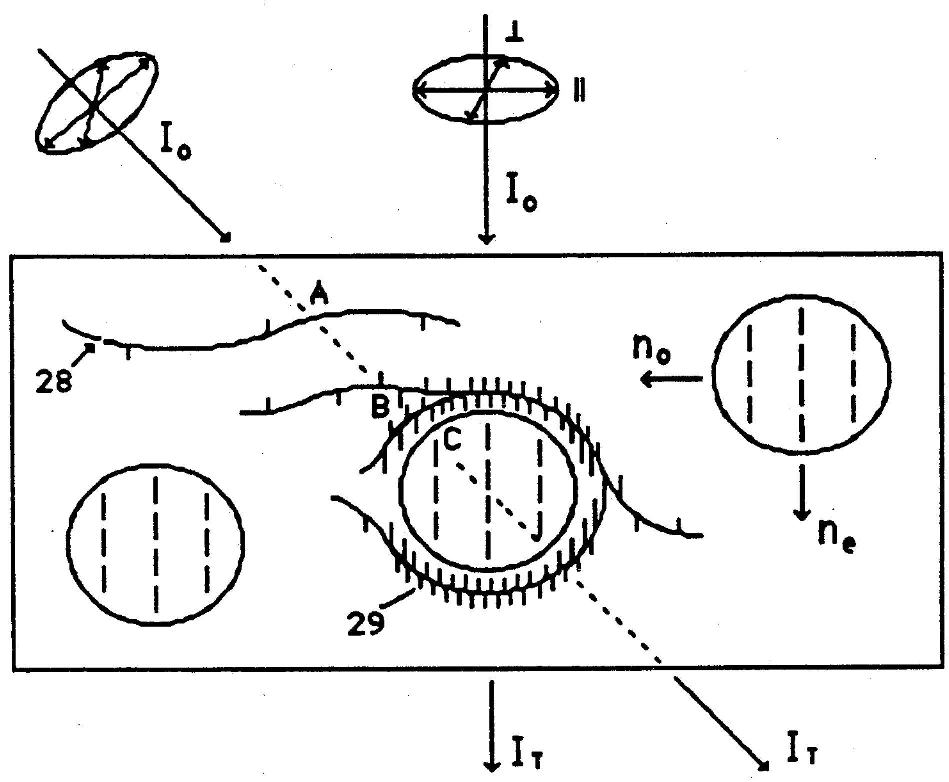
FIG. 8 is an illustration of the path of a light ray passing through a display of this invention.

FIG. 8 illustrates this situation of changing the viewing angle. The center polymer 28 may or may not be comb-shaped normal polymer. A liquid crystal microdroplet is encased with polymer having continuously varied composition and the inner surface 11 and its adjacent polymer 29 consist of comb-shaped polymer or liquid-crystalline polymer. At this solid-liquid interface 11, the refractive indexes are easily matched because of their similar structures and optical properties. When an incident light perpendicular to the substrate passes through the display, the light is not scattered because there is no sudden change in refractive index. With a tilted incident light travelling through the display along points A, B, and C, point A is in the center of the polymer between droplets and Point B is in a part of the polymer 29 adjacent the inner surface 11. The refractive index is continuously varied from point A to B, so there is no scattering in this path. If the comb-shaped polymer at inner surface 11, at point C, and its adjacent polymer 29 are composed of surface active comb-shaped polymer, the comb-shaped inner surface can effectively align liquid crystals in the microdroplet and the refractive indexes of the comb-shaped polymer and the liquid crystals are quite close. Since the polymer composition is continuously varied and the refractive indexes are matched at the interface 11 and its adjacent polymer, the refractive index of the entire system is continuously varied. Therefore, light can pass through this system without scattering or reflecting. In accord with the same principle, light can travel smoothly out of the droplet. Natural light or any kind of polarized light has the same behavior when it travels through such a material. The key to the wide viewing angle is a system with continuously varied refractive index. It is not required for the wide viewing angle that the inner surface 11 and the polymer 29 adjacent the inner surface be a comb-shaped polymer or a liquid-crystalline polymer.

Figure 9:
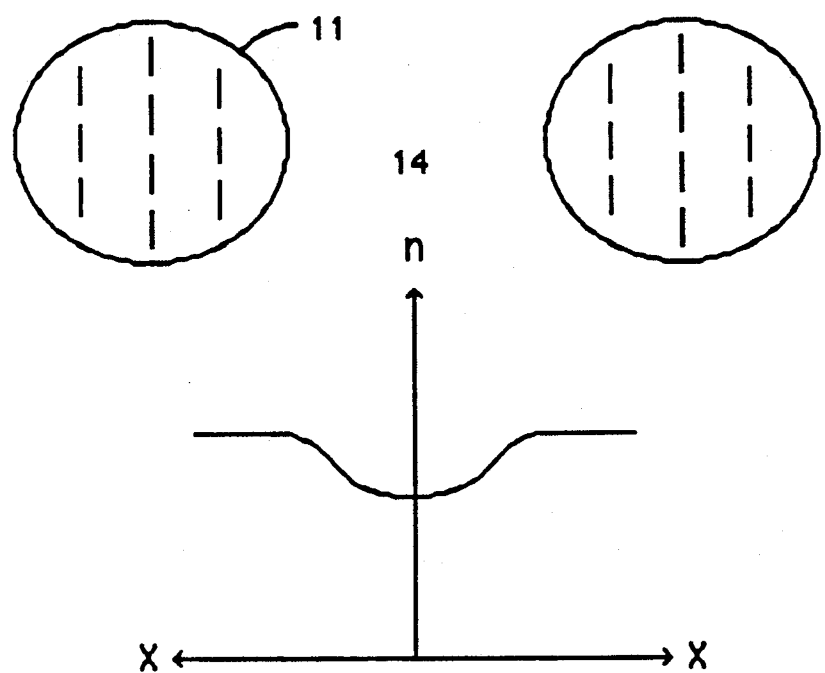
FIG. 9 is a graph illustrating the variation of index of refraction between droplets of this invention.

The distribution of refractive index between microdroplets is illustrated in FIG. 9, where the Y-axis measures index of refraction and the X-axis measures the distance between droplets, where the refractive index of the polymer $n_p$ varies with distance. If the polymer between droplets consists of more aliphatic chains, the refractive index will be lower, as shown. If the polymer between droplets consists of more aromatic groups, the refractive index may instead slightly increase.

The acrylic family of monomers is useful for copolymerization to form the polymers of this invention because many available acrylic compounds have different reactivities. The acrylic family includes acrylic acids, acrylates and acrylamides, and occupies a very important position in radical chain polymerization. Both ultraviolet curing and thermal curing can be used to polymerize acrylic compounds. A major advantage of the UV curing system in this invention is its short processing period. Usually only a few seconds or minutes are needed for the polymerization. Acrylic compounds can be represented by the following general formula:

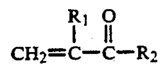

where $R_1$ may be hydrogen, methyl or alkyl, and $R_2$ may be hydroxy, alkoxyl, alkylamine or other groups. The acrylic system is very useful in the present invention because it can contain various functional groups. Different combinations of $R_1$ and $R_2$ offer hundreds of acrylic compounds. These compounds are usually available commercially and can provide various properties of polymers and copolymers. The acrylic system also provides copolymers having a wide range of refractive index (n=1.3–1.7). These properties are especially important in electro-optical applications of liquid crystals.

Although many reactions can occur at electron-deficient carboxyl carbon atoms and electron-releasing resonance carbon-oxygen double bonds, acrylic polymers are formed by a radical, anionic or cationic chain polymerization of the carbon-carbon double bond. Initiation is usually needed for this chain copolymerization. Once a reactive center is generated, a chain reaction occurs rapidly to a large size molecule. The fast curing system is also good for an automatic process. It is very common to convert two or more acrylic monomers into a copolymer.

The rate of polymerization and properties of the polymer are greatly influenced by substituted groups $R_1$ and $R_2$. This characteristic can be used to design some special compounds to meet the requirements of forming the reverse mode display. Surface properties can be considered in the design of new acrylic compounds.
Some silylacrylates with a slow curing rate and low surface free energy have been found and are as follows:
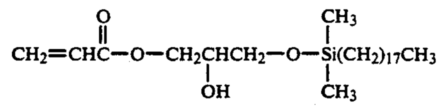
1
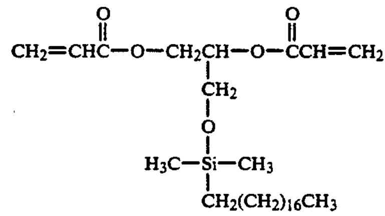
2
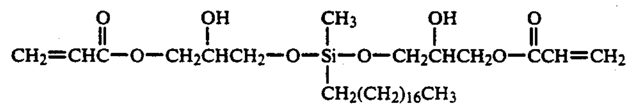
3
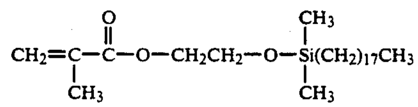
4
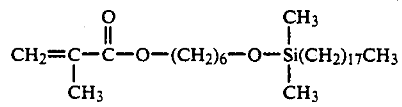
5
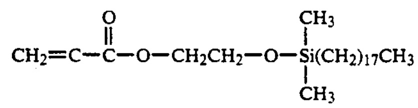
6
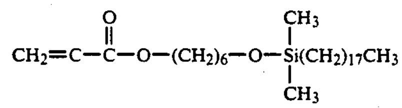
7
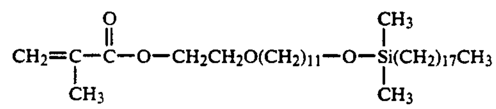
8
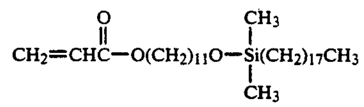
9
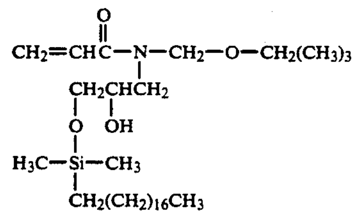
10
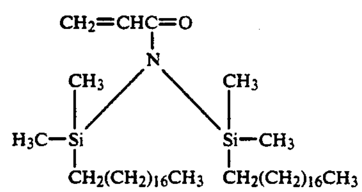
11

-continued

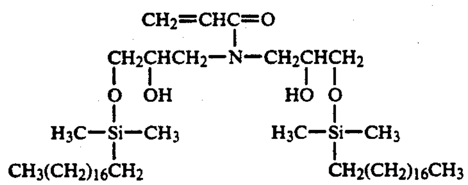

12

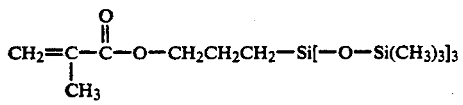

13

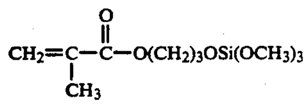

14

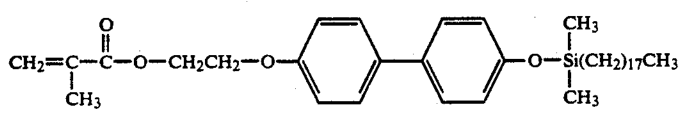

15

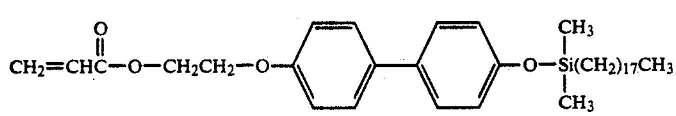

16

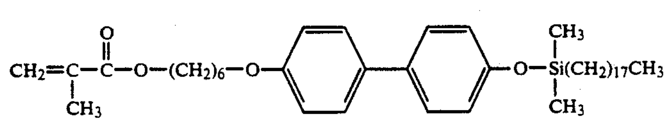

17

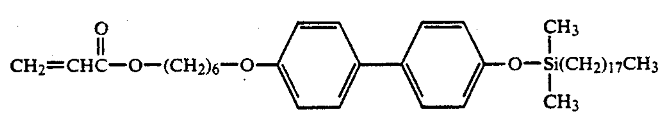

18

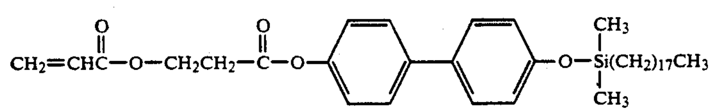

19

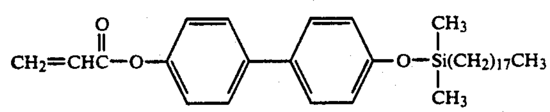

20

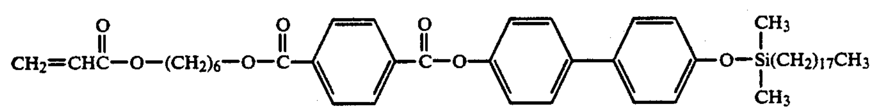

21

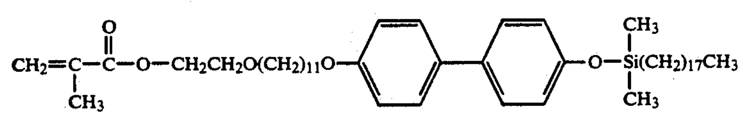

22

Compounds 1 to 12 have silicone-containing long chains and can form surface active comb-shaped polymer. Compounds 15 to 22 have mesogenic groups and silicone-containing long chains and can form surface active liquid-crystalline polymer. They possess two or more of the following four parts: (a) a linking group, which is a carbon-carbon double bond of acrylate, (b) a spacer group, which is a short or long chain between the linking group and a mesogenic group, (c) a rigid mesogenic group, such as biphenylene or triphenylene, and (d) a tail part, such as an aliphatic silane.

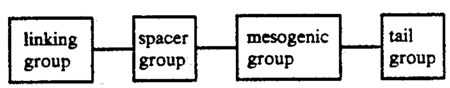

After polymerization, the linking groups form main chains of comb-shaped polymer. It is important to use a silicon-containing long chain group as a tail in the monomers. The reason for bringing the mesogenic group and the aliphatic silane together is to form a liquid-crystalline polymer which produces a homeotropic alignment with a liquid crystal material. Comb-shaped polymers may be anisotropic materials. The comb-shaped polymer can increase the viewing angle when it is used in the microdroplet display, by means which are explained below. However, a normal liquid-crystalline polymer usually has a high surface free energy and forms a parallel alignment with liquid crystal molecules. Therefore, a normal liquid-crystalline polymer can be used as a normal polymer, if it has fast curing rate. The desired comb-shaped polymers have side chains perpendicular to the substrate when the solid phase is formed. The side chains may be in the nematic phase and then align liquid crystal molecules in the droplets perpendicular to the substrate.

The linking group may be other functional groups, depending on what kind of polymerization process is used. The spacer part may be longer or shorter, or contain functional groups. The mesogenic groups may be a rigid part of any common positive or negative liquid crystals. The tail part may be a longer or shorter chain which provides low surface free energy, and may contain more silicon atoms and other functional groups. The silicon atoms may be in both ends of the tail or in the middle of the tail. The tail may contain an element other than silicon to provide a low surface free energy. A fluorine-containing chain as a tail is also suitable to provide a low surface free energy. Any of these four groups may contain silicon and/or fluorine atoms. It is not always necessary to have the four parts in one molecule structure. A molecule having the two or three parts can be useful as a surface active monomer if it has a low curing rate and a low surface energy. It is important to understand the general definition of surface active monomer, which has a relative lower curing rate and can provide a homopolymer with homeotropic alignment. An unpolymerized coating of the surface active monomer may or may not provide a homeotropic alignment. The surface active monomer could have any structure including other surfactant structures, if it has the property of causing the liquid crystal molecules to be homeotropically aligned to the surface.

Acrylic acid ($n=1.42$), 2-cyanoethyl acrylate ($n=1.44$), N-(isobutoxymethyl) acrylamide ($n=1.46$) and acrylamide (solid) have been found to be very good components of normal monomers. Acrylic acid has a very fast curing rate and the homopolymer of acrylic acid is hard and brittle. 2-Cyanoethyl acrylate has a fast curing rate, a large shrinkage in polymerization, and its homopolymer is elastic. N-(Isobutoxymethyl) acrylamide has a fast curing rate, and offers a tough homopolymer with large shrinkage and good adhesion. Acrylamide is solid and can be dissolved in other acrylic compounds. Acrylamide has a very fast curing rate, and offers a hard brittle homopolymer. Many other acrylates have fast curing rate. Combination of these monomers can offer various properties of copolymer and a range of refractive index.

A mixture of the normal monomers and one or more surface active monomers, such as those disclosed above, negative liquid crystals, such as ZLI-4330 (available from EM Industries), and a photoinitiator, such as Darocur-1173, can form a homogeneous solution at certain temperatures. The amount of these monomers depends on their relative reactivities and other properties. As discussed before, the polymeric phase has a continuously varying composition, and when using a surface active comb-shaped polymer as a part of the polymer adjacent to the inner polymeric surface, a transparent state can be obtained.

Step polymerization usually proceeds with reactants between two different functional groups. The epoxy system is a typical example of step polymerization. Epoxy resin and thiol curing agent can serve as the normal polymer system. This system provides a relatively high curing rate.

Since the polymer has a high surface free energy, it has been used in normal mode polymer dispersed liquid crystal (PDLC) displays. In order to produce a low surface free energy, silylamines can be synthesized and added in the system as a surface active curing agent. A silylamine curing agent provides a slow curing rate and low surface free energy. This molecular design takes advantage of the secondary amine having low reactivity and silane having low surface free energy. Linking a secondary amine and a silane together offers a new compound which meets the requirements mentioned above. For example, the silylamine, 4-[N-(dimethyloctadecylsilyl)aminomethyl]piperidine, or compound 23, can independently react with the epoxy resin.

This reaction is designed based on the fact that the rate of epoxy-mercaptan reaction $R_{EM}$ is faster than the rate of epoxy-primary amine reaction $R_{EPA}$, and the rate of epoxy-primary amine reaction is faster than the rate of epoxy-secondary amine $R_{ESA}$, that is:

$$R_{EM}>R_{EPA}>R_{ESA}$$

Other silylamines have been designed for curing epoxy resin. Examples including the following compounds:

23

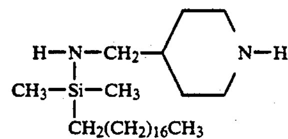

24

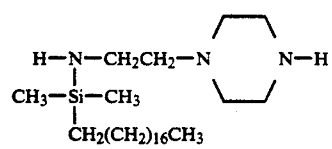

25

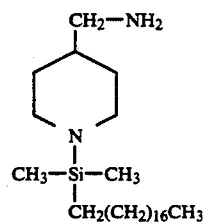

26

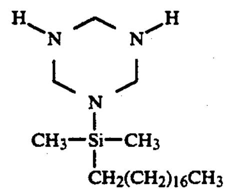

-continued

27

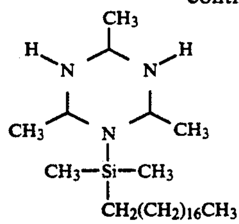

Step polymerization needs at least two reactants. The above example of epoxy-silylamine reaction only uses one component having low reactivity and low surface free energy. Both reactants having a low reactivity and low surface free energy can also be used in the epoxy system. Since reactivity of epoxy resin greatly depends on the type of epoxy group and is affected by functional groups surrounding the epoxy group, different epoxy resins may have greatly differt reactivities. For example, bisphenol A type epoxy resin has a high reactivity and cycloaliphatic epoxy and silylepoxy have very low reactivity. Compound 28 and 29 can be synthesized by linking epoxy and cycloaliphatic epoxy group with silane.

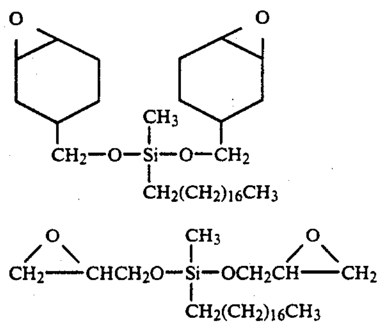

Various polymer structures can be obtained by different combinations of the reactive monomers and curing agents. It is not necessary to match refractive index between the main polymer matrix and liquid crystals. However, the refractive index of polymer 29 adjacent to the inner surface needs to be matched with the ordinary refractive index of liquid crystals $n_o$.

In order to form the bulk of the polymer, several fast curing resins with high surface free energy can be used. Fast curing epoxy resins and curing agents which can provide different properties of copolymer are preferred. Examples include Epon 828 (available from Shell Chemical Co.), which is a bisphenol A type, having a refractive index n=1.57, DNR 439 (available from Dow Chemical Co.), which is a phenolic novolac type having n=1.60, and Epon 812 (glycerine type, n=1.48), Capcure 3-800 (available from Diamond Shamrock Co.), which is a trithiol resin, n=1.50, and Capcure 40 (actived trithiol resin, n=1.50). Dependent on different negative liquid crystals, different ratios of these epoxy resins can meet most of the requirements of a reverse mode display.

An important feature of the reverse mode system of this invention is continuously varying surface free energy during droplet formation. The side chains in the comb-shaped polymer are perpendicular to the substrate. The surface active side chains of the polymer encase droplets of liquid crystal. The side chains effectively align liquid crystals in the droplet perpendicular to the substrate, and not perpendicular to the surface of the droplet, whether the shape of the droplet is round or elongated. This makes the display haze-free.

The methods and materials of this invention will also increase the viewing angle of normal mode microdroplet systems. In this embodiment of the invention, both higher reactivity monomer and lower reactivity monomer used for normal mode display are normal monomers. Such normal monomers provide a parallel alignment with positive liquid crystals. The wide viewing angle is still depended on a system with continuously varied refractive index. The refractive index of the polymer adjacent the inner surface needs to be matched with the ordinary refractive index $n_o$ of the positive liquid crystals to obtain a clean state when applying an electric field. The inner surface and the polymer adjacent the inner surface may be consisted of comb-shaped polymer, but this is not a required condition. Many common liquid crystalline monomers can be used as such lower reactivity monomers. For example, fast UV curable monomer(s) and slow curing normal monomer of liquid-crystalline polymer, such as compounds 30 and 31, as well as other chemicals, and positive liquid crystals, such as E-7 (available from EM Industries), are used to produce a new type wide viewing angle normal mode PDLC display.

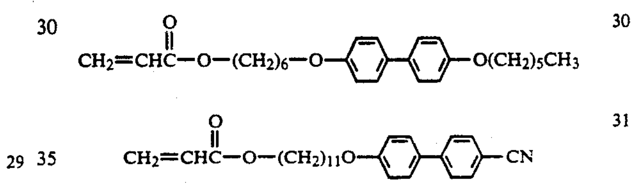

An advantage of this application is that the general problem of compatibility between liquid-crystalline monomers and liquid crystals is solved, because small molecular weight normal monomers usually have greater solubility. An important feature of the reverse mode and normal mode copolymer systems of this invention is continuously varying index of refraction.

Since flattening the microdroplets of liquid crystals can affect the response time for a display, means of flattening are useful. One novel technique which can be used to flatten microdroplets of liquid crystals is to apply an electric field during microdroplet formation and polymerization. This technique is especially useful in the formation of the reverse mode display. Applying an extra force perpendicular to the applied electric field extends the size before the polymer is hard enough to prevent deformation. At the early stage of polymerization, phase separation occurs and microdroplets are embedded within a soft or semi-cured polymer. When an electric field is applied to the negative liquid crystals in the anisotropic phase, the field aligns the liquid crystals parallel to the substrate and applies an extra force in the plane which is normal to the field. Flattened microdroplets are formed when polymerization proceeds in the presence of the extra force.

EXAMPLES

Synthesis of dimethyl 2,3-epoxypropoxy octadecyl silane, or DEPOS:

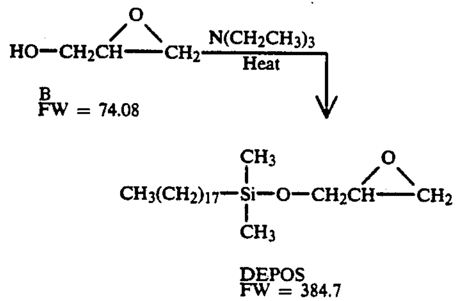

Dimethyl octadecyl chlorosilane A (10.0 G) was placed in a 100 mL flask. Glycidol B (4.0 G) was added to the flask. A mixture of ether (60 mL) and triethylamine (30 mL) was added to the flask.

The mixture was refluxed for 2 hours and then ether was removed by distillation. After adding 50 mL of triethylamine, the resulting mixture was refluxed for five hours (90° C.). The solvent triethylamine was removed by distillation and the residue was washed with water. Oil was separated with the washings. The oil was dissolved in 150 mL of acetone and then the mixture was filtered. After distilling off acetone, the residue was heated to 150° C. to remove low boiling point material and to afford 8.3 G of DEPOS. Column chromatography was used for purification. Synthesis of (3-acryloxy-2-hydroxy)propoxy dimethyl octadecyl silane or ADOS (Compound 1).

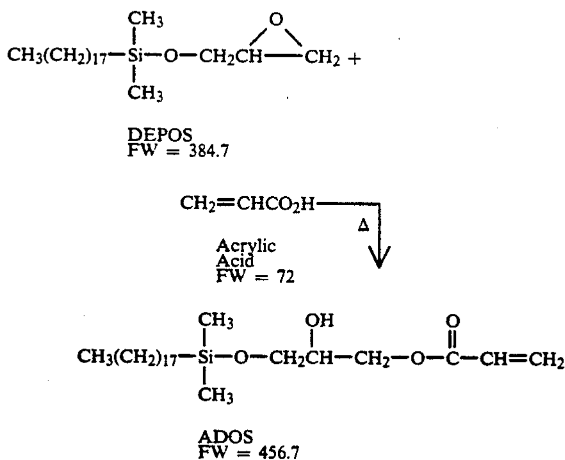

3.0 G of DEOPS (7.8 mmole) and 1.0 G of acrylic acid was mixed in a sample vial. The mixture was heated at 75°-80° C. for 16 hours.

The mixture was transferred into a flask and excess acrylic acid was distilled off and the residue was heated to 160° C. to remove low boiling point material. The hot residue was filtered to offer 2.6 G of ADOS. Column chromatography was used for purification.

Preparation of directly formed reverse mode polymer dispersed liquid crystal display by UV polymerization:

| Formulation A (scattering mode): | |
|---|---|
| Darocur-1173 (photoinitiator) | 0.02 G |
| Compound 1 | 0.1 G |
| Acrylic Acid | 0.25 G |
| N-(Isobutoxymethyl)acrylamide | 0.2 G |
| ZLI-4330 | 0.4 G |

A mixture of formulation A was placed in a sample vial. The mixture was heated to 60° C. to obtain a homogeneous solution. Spacer (20μ) was sprayed on two indium tin oxide (ITO) coated glasses. Some of the solution was applied on one of the glasses and the upper layer of ITO coated glass was fastened to the first glass. The sample was slightly pressed to make it uniform. The samples were exposed for 30-80 seconds under UV light at 50°-60° C.

After UV exposure, the samples had good reverse mode effect and wide viewing angle. The samples were very transparent in the absence of an electric field, and exhibited high scattering when 35 volts of AC was applied.

The general procedure for preparation of directly formed polymer dispersed liquid crystal displays by UV polymerization is:

Prepare a mixture of monomers or resin in a vial, along with the liquid crystals. Maintain the mixture at a temperature to obtain a homogeneous solution, usually from −10° C. to 80° C. Spray spacer on two indium tin oxide coated glasses (or films) or mix the spacer in the mixture. Apply some of the solution on one of the glasses and then fasten two glasses together. Press the glasses sightly to make the spacing uniform. Expose the mixture of monomers to UV light, for a time between 10 seconds and 10 minutes, and at a temperature of −10° C. to 80° C. Multiple samples of differing composition may be prepared to find optimum formulations.

The following formulations are suitable for preparing directly formed polymer dispersed liquid crystal displays by UV polymerization:

| Formulation B (reverse and absorbing mode): | |
|---|---|
| Darocur-1173 | 0.02 G |
| Compound 1 | 0.10 G |
| Methacryloxypropyltrimethoxysilane | 0.05 G |
| Acrylic Acid | 0.20 G |
| N-(Isobutoxymethyl)acrylamide | 0.22 G |
| ZLI-2806 (with 2% blue dichroic dye) | 0.50 G |
| **Formulation C (reverse and scattering mode):** | |
| Darocur-1173 | 0.02 G |
| Compound 1 | 0.06 G |
| Compound 15 | 0.04 G |
| Acrylic Acid | 0.25 G |
| N-(Isobutoxymethyl)acrylamide | 0.20 G |
| Isodecyl Methacrylate | 0.02 G |
| ZLI-4330 | 0.50 G |
| **Formulation D (reverse and scattering mode):** | |
| Darocur-1173 | 0.02 G |
| Compound 1 | 0.06 G |
| Compound 22 | 0.02 G |
| Acrylic Acid | 0.22 G |
| N-(Isobutoxymethyl)acrylamide | 0.28 G |
| Isodecyl Methacrylate | 0.01 G |
| ZLI-4330 | 0.50 G |
| **Formulation E (reverse and scattering mode):** | |
| Darocur-1173 | 0.02 G |
| Compound 1 | 0.05 G |
| Compound 15 | 0.01 G |
| Compound 22 | 0.01 G |

-continued

| | |
|---|---|
| Acrylamide | 0.02 G |
| N-(Isobutoxymethyl)acrylamide | 0.30 G |
| 1,6-Hexanediol diacrylate | 0.01 G |
| ZLI-4330 | 0.55 G |

| Formulation F (normal and scattering mode): | |
|---|---|
| Darocur-1173 | 0.02 G |
| Compound 30 | 0.05 G |
| Compound 31 | 0.05 G |
| Acrylic Acid | 0.10 G |
| N-(Isobutoxymethyl)acrylamide | 0.30 G |
| Isodecyl Methacrylate | 0.02 G |
| E-7 | 0.60 G |

The general procedure for preparation of directly formed polymer dispersed liquid crystal displays by thermal polymerization is as follows:

Prepare a mixture of monomers or resin in a vial, along with the liquid crystals. Maintain the mixture at a temperature to obtain a homogeneous solution, usually 10° C. to 70° C. Spray spacer on two indium tin oxide coated glasses (or Films) or mix the spacer in the mixture. Apply some of the mixture to one of the glasses and then fasten the two glasses together, slightly pressing to make the spacing uniform. Heat the samples in an oven at 50°-120° C. for a time sufficient to cure the resin, usually about 1 to 24 hours. Multiple samples of differing compositions may be prepared to select optimum formulations.

A formulation which is suitable for such display is as follows:

| Formulation G (reverse and absorbing mode): | |
|---|---|
| Compound 23 | 0.05 G |
| Compound 25 | 0.05 G |
| Epon 828 | 0.19 G |
| Epon 812 | 0.31 G |
| Capcure 3-800 | 0.30 G |
| ZLI-2806 (with 2% blue dichroic dyes) | 0.55 G |

What is claimed is:

1. A polymer-dispersed liquid crystal light shutter device for transmitting and scattering light comprising:
   a non-homogeneous light transmissive copolymer matrix; and
   droplets of liquid crystal material dispersed in the copolymer matrix.

2. The device of claim 1 wherein the copolymer matrix is comprised of at least two monomers having differing reactivities and the droplets of liquid crystal material are spontaneously formed from solution during solidification of the film.

3. The device of claim 1 wherein the refractive index around the droplets continuously varies with composition of the copolymer and the copolymer composition continuously varies with distance from the surface of the droplets, so as to provide a wider viewing angle of the device.

4. The device of claim 1 wherein the refractive index of the copolymer adjacent to the surface of the droplets is substantially matched with the refractive index of the liquid crystal material formed from solution, so as to provide a wider viewing angle of the device.

5. The device of claim 2 wherein the monomer having higher reactivity is a normal monomer and the monomer having lower reactivity is a surface active monomer, the liquid crystal material is negative type, and the ratio of normal monomer to surface active monomer is selected to produce a homeotropic alignment, the device being reverse mode.

6. The device of claim 2 wherein the monomers are normal monomers and the liquid crystal material is positive type and the display device is normal mode.

7. The device of claim 2 wherein the monomer having higher reactivity has a comb-shaped structure.

8. The device of claim 2 wherein the monomer having lower reactivity has a comb-shaped structure.

9. The device of claim 2 wherein the monomer having lower reactivity has a liquid crystalline structure.

10. The device of claim 2 wherein the copolymer comprises an acrylic or an epoxy resin.

11. The device of claim 2 wherein the monomer having highest reactivity is a normal monomer and at least two monomers having lower reactivity comprise a surface active monomer, the liquid crystal material is negative type, and the ratio of normal monomer to surface active monomer is selected to produce a weak homeotropic alignment, the liquid crystal material being aligned so as to produce less haze in the display.

12. The device of claim 5 wherein the surface-active monomer is comprised of silicon-containing or fluorine-containing groups.

13. The device of claim 5 wherein the surface active monomer is comprised of an acrylic group, amine group, or epoxy group.

14. The device of claim 8 wherein the side chains of the comb-shaped polymer are comprised of silicon or fluorine, so as to align liquid crystal material in the droplets substantially perpendicular to the surface of the film.

15. The device of claim 8 wherein the comb-shaped polymer is comprised of a linking group and a group selected from a group consisting of spacer, mesogenic and tail groups.

16. The device of claim 8 wherein the linking group of the comb-shaped polymer is selected from a group consisting of acrylic, amine and epoxy groups.

17. The device of claim 8 wherein the comb-shaped polymer is comprised of linking, mesogenic and tail groups and the tail group is a long chain comprising silicon or fluorine.

18. A method of forming a polymer-dispersed liquid crystal light shutter device for transmitting and scattering light comprising:
   mixing a higher reactivity monomer, a lower reactivity monomer and a liquid crystal material to form a homogeneous solution; and
   curing the copolymer.

19. The method of claim 18 wherein the higher reactivity monomer is a normal monomer, the lower reactivity monomer is a surface active monomer and the liquid crystal material is negative type, wherein the ratio of normal monomer to surface active monomer is varied to select an effective composition producing a homeotropic alignment of liquid crystals in the droplets and a reverse mode.

20. The method of claim 18 wherein the monomers are normal monomers and the liquid crystal material is of the positive type, the device produced being normal mode.

21. The method of claim 18 wherein one of the monomers has a comb-shaped structure.

22. The method of claim 19 wherein the surface active monomer is comprised of a silicon-containing or fluorine-containing group.

23. A method for flattening microdroplets of negative liquid crystal material dispersed in a polymer comprising:
   applying an electric field to the polymer during the time the microdroplets are spontaneously forming from solution and the liquid crystal material is in an anisotropic state.

* * * * *